United States Patent
Hoogerwerf et al.

(10) Patent No.: US 8,024,482 B2
(45) Date of Patent: Sep. 20, 2011

(54) DYNAMIC FIREWALL CONFIGURATION

(75) Inventors: Scott Hoogerwerf, Seattle, WA (US);
John E. Araya, Bellevue, WA (US);
Jeffrey S. Williams, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 157 days.

(21) Appl. No.: 12/371,638

(22) Filed: Feb. 16, 2009

(65) Prior Publication Data

US 2010/0211658 A1    Aug. 19, 2010

(51) Int. Cl.
*G06F 15/16*    (2006.01)

(52) U.S. Cl. ............. 709/246; 709/223; 726/11; 726/12

(58) Field of Classification Search .................. 709/223, 709/246; 726/11, 12
See application file for complete search history.

(56) References Cited

U.S. PATENT DOCUMENTS

| | | | |
|---|---|---|---|
| 6,012,088 A | 1/2000 | Li et al. | |
| 6,463,474 B1 * | 10/2002 | Fuh et al. | 709/225 |
| 6,832,321 B1 * | 12/2004 | Barrett | 726/11 |
| 7,146,639 B2 * | 12/2006 | Bartal et al. | 726/11 |
| 7,222,359 B2 * | 5/2007 | Freund et al. | 726/3 |
| 7,284,267 B1 * | 10/2007 | McArdle et al. | 726/11 |
| 7,506,054 B1 * | 3/2009 | Fuh et al. | 709/225 |
| 7,610,621 B2 * | 10/2009 | Turley et al. | 726/11 |
| 7,778,193 B2 * | 8/2010 | Mizuno et al. | 370/252 |
| 7,853,998 B2 * | 12/2010 | Blaisdell et al. | 726/12 |
| 7,865,726 B2 * | 1/2011 | Corley et al. | 713/166 |
| 2003/0046583 A1 | 3/2003 | Goldman et al. | |
| 2003/0069947 A1 | 4/2003 | Lipinski | |
| 2003/0154380 A1 * | 8/2003 | Richmond et al. | 713/182 |
| 2005/0005093 A1 * | 1/2005 | Bartels et al. | 713/150 |
| 2005/0015592 A1 * | 1/2005 | Lin | 713/166 |
| 2005/0078624 A1 | 4/2005 | Shu et al. | |
| 2005/0125693 A1 | 6/2005 | Duplessis et al. | |
| 2006/0130133 A1 | 6/2006 | Andreev et al. | |
| 2007/0199061 A1 * | 8/2007 | Byres et al. | 726/11 |
| 2007/0204338 A1 * | 8/2007 | Aiello et al. | 726/11 |
| 2008/0092223 A1 * | 4/2008 | Setia et al. | 726/11 |
| 2008/0133717 A1 | 6/2008 | Bouchat et al. | |
| 2008/0148381 A1 * | 6/2008 | Aaron | 726/11 |
| 2008/0282314 A1 * | 11/2008 | Abzarian et al. | 726/1 |
| 2008/0289026 A1 | 11/2008 | Abzarian et al. | |

OTHER PUBLICATIONS

Maki Teemu,"Explicit Mechanisms for Controlling NAT/Firewall Systems Dynamically", retrieved at<<http://www.tml.tkk.fi/Publications/C/23/papers/Maki_final.pdf>>, pp. 6.

* cited by examiner

*Primary Examiner* — Kevin Bates
(74) *Attorney, Agent, or Firm* — Toler Law Group, IP

(57) ABSTRACT

A method is disclosed that includes detecting a network entity and determining a type of the detected network entity. The method includes retrieving firewall configuration information based on at least the type of the network entity. Based on the firewall configuration information, a configuration of a firewall at a host is automatically and dynamically modified.

20 Claims, 5 Drawing Sheets

DYNAMIC FIREWALL CONFIGURATION

BACKGROUND

Firewalls play a security role by blocking certain communications to/from a computer on a network. Typically, when a new network or device is connected to the computer, the firewall is manually configured to allow proper operation of the network or device. Manual configuration of firewalls is a technical task that can involve many steps and may be difficult or burdensome for computer users. Such manual configuration typically relies on a user to answer configuration questions and to understand underlying firewall configuration settings (e.g., ports and protocols). During manual configuration of the firewall, a personal computer (PC) user may improperly configure the firewall or completely disable the firewall. As a result, PC security may be diminished, resulting in the PC being more susceptible to network based attacks.

Firewalls typically assume a static machine-wide configuration. For example, a particular port may be opened for all network connections, and certain network connections may be specified as safe or unsafe. A typical firewall may be configured such that if a capability is present, the capability is desirable for all users regardless of individual user preferences.

SUMMARY

The present disclosure relates to automatic configuration of a firewall upon detection of a network entity. For example, a physical connection of the network entity at a host computer or a remote connection of the network entity via a wired or wireless network may be detected. For example, a remote device may be connected to a host computer via the Internet or via a virtual private network (VPN), or via any other network. By determining a type of the detected network entity, predetermined firewall configuration information may be retrieved (e.g., from a dynamic information store). A configuration (e.g., ports, protocols, etc.) of the firewall may be modified according to the predetermined firewall configuration information associated with the type of the network entity. Further, the configuration of the firewall may be modified based on previous user choices related to usage of other devices on the network. The present disclosure provides a system that allows firewall configuration decisions to be made upon detection of the network entity, rather than a static machine-wide configuration (i.e., port X is open for all network connections on the host computer).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
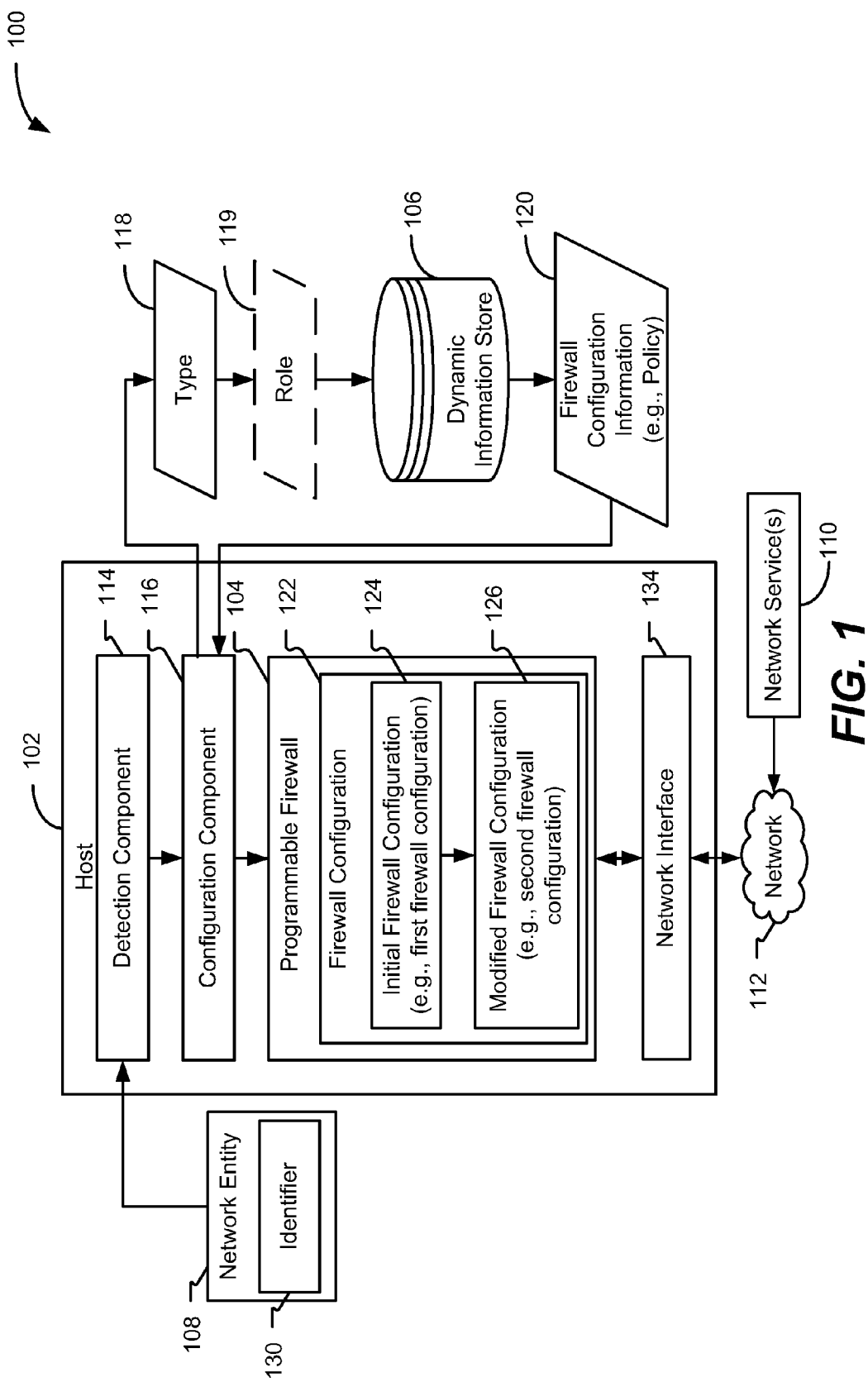
FIG. 1 is a block diagram of a first embodiment of a dynamic firewall configuration system.

In order for a firewall to be effective, the firewall is typically configured according to an individual personal computer's environment, use, and user preferences. The present disclosure describes automatic configuration of a firewall without relying on the user to supply technical firewall configuration information. Firewall configuration decisions may be made automatically, such as in response to detection of a network entity. The network entity may a local device or any type of component having an interface to a network. For example, the network entity may include a device (such as a game console, a cellular telephone, a personal digital assistant (PDA), a printer, a personal computer (PC), an ActiveSync device, or a television tuner, among other alternatives) that is physically connected to a host computer or remotely connected to the host computer via a network connection. Automatic detection of the network entity by a host computer enables the firewall configuration to be modified automatically and without user input.

In the present disclosure, while detection of the network entity is automatic, a user may also define environment preferences related to available functions. The present disclosure provides a system that allows firewall configuration decisions to be made upon detection of the network entity, rather than a static machine-wide configuration.

In a particular embodiment, a method is disclosed that includes detecting a network entity and determining a type of the detected network entity. The method includes retrieving firewall configuration information based on at least the type of the network entity. Based on the retrieved firewall configuration information, a configuration of a firewall at a host is automatically and dynamically modified from a first firewall configuration to a second firewall configuration.

In another particular embodiment, a system includes a programmable firewall at a host, a detection component, and a configuration component. The detection component is operable to detect a network entity and to determine a type of the detected network entity. The configuration component is operable to retrieve firewall configuration information from a dynamic information store based on at least the type of the network entity. The configuration component is further operable to automatically modify a configuration of the programmable firewall at the host based on the retrieved firewall configuration information.

In another particular embodiment, a computer-readable storage medium is disclosed. The computer-readable storage medium includes instructions, that when executed by a computer, cause the computer to detect a network entity and to determine a type of the detected network entity. The computer-readable storage medium also includes instructions, that when executed by the computer, cause the computer to determine a role associated with the network entity based on at least one user action. For example, the at least one user action may include at least one previous action performed by a user. In this manner, a user's intent may be inferred from actions and a computer does not need to rely on the user's understanding of specific firewall configuration settings. The computer-readable storage medium also includes instructions, that when executed by the computer, cause the computer to retrieve firewall configuration information from a dynamic information store based on the type of the network entity and the role associated with the network entity. The computer-readable storage medium also includes instructions, that when executed by the computer, cause the computer to automatically and dynamically modify a configuration of a firewall at the computer based on the retrieved firewall configuration information.

Referring to FIG. 1, a first embodiment of a dynamic firewall configuration system is illustrated and generally designated 100. In the embodiment illustrated in FIG. 1, the system 100 includes a host 102 with a programmable firewall 104, a detection component 114, a configuration component 116, and a network interface 134. The host 102 is in communication with a dynamic information store 106. The configuration of the programmable firewall 104 is stored as a firewall configuration 122. For example, the firewall configuration 122 may include one or more ports, one or more communication protocols, and one or more services. The firewall configuration 122 of the programmable firewall 104 may be automatically and dynamically modified upon detection of the network entity 108, using the firewall configuration information 120 retrieved from the dynamic information store 106.

The detection component 114 is operable to detect a network entity 108 and to determine a type 118 of the detected network entity 108. For example, the detection component 114 may detect a physical connection of the network entity 108 at the host 102 or may detect a remote connection of the network entity 108 (e.g., via a network). As an example, the network entity 108 may be remotely connected to the host 102 via a wired or wireless network. In a particular embodiment, the configuration component 116 is operable to retrieve firewall configuration information 120 from the dynamic information store 106 based on the type 118 of the network entity 108. The configuration component 116 is further operable to automatically modify the firewall configuration 122 of the programmable firewall 104 based on the retrieved firewall configuration information 120. The network interface 134 is operable to send data to and receive data from one or more network services 110 via a network 112 (e.g., the Internet).

In the embodiment illustrated in FIG. 1, the dynamic information store 106 is not stored locally at the host 102. For example, the dynamic information store 106 may be stored at a remote server accessible via a network connection. In a particular embodiment, the dynamic information store 106 is updatable, and a web service or definition update channel may be associated with the dynamic information store 106. In alternative embodiments, the dynamic information store 106 may be stored locally at the host 102, such as in a hard drive or other mass storage device at the host 102.

In operation, the network entity 108 may request access to one or more network services 110 via the host 102. The detection component 114 detects the network entity 108 and gathers information associated with the detected network entity 108. Based on the gathered information, the detection component 114 determines the type 118 of the network entity 108. For example, the type 118 may be determined based on an identifier 130 of the network entity 108, based on a fingerprint associated with the network entity 108, or any combination thereof. In a particular embodiment, the fingerprint of the network entity 108 may be generated by the host 102 based on information from the network entity 108 (e.g., based on a previous detection of the network entity 108).

In one embodiment, the network entity 108 may include a local device physically connected to the host 102. The type 118 of the network entity 108 may include a gaming device, a television tuner, a network device (e.g., a local area network (LAN) device), a wireless network interface card (NIC), a digital cable receiver, a mobile device, or any other suitable network device type. For example, the mobile device may include a Third Generation (3G) type wireless device, an ActiveSync device, an Infrared Data Association (IrDa) device, a Bluetooth device, a universal serial bus (USB) device, or an Institute of Electrical and Electronics Engineers (IEEE) 1394 device, among other alternatives. In another embodiment, the network entity 108 may include a remote device located at a location remote from the host 102. The remote device may be connected to the host 102 via a network. For example, the remote device may be connected to the host 102 via the Internet or via a virtual private network (VPN), or via any other network. It should be noted that the above examples are for illustration purposes only. The network entity 108 may include any type of component having a network communication element.

The configuration component 116 uses the type 118 of the network entity 108 determined by the detection component 114 to query the dynamic information store 106. The dynamic information store 106 includes predetermined firewall configuration information 120 associated with a plurality of types of network entities. Based on the firewall configuration information 120 retrieved from the dynamic information store 106, the firewall configuration 122 of the programmable firewall 104 may be automatically modified to accommodate connection of the network entity 108. In the embodiment illustrated in FIG. 1, a single network entity (e.g., the network entity 108) is shown. In alternative embodiments, the detection component 114 may detect multiple network entities.

In a particular embodiment, the programmable firewall 104 is modified at substantially the same time as when the detection component 114 detects the network entity 108. Thus, the system 100 of FIG. 1 may allow automatic and dynamic firewall configuration adjustment using the predetermined firewall configuration information 120. The system 100 of FIG. 1 may also allow dynamic firewall configuration adjustment by modifying the firewall configuration 122 in response to detection of the network entity 108.

In the embodiment illustrated in FIG. 1, the modifications to the programmable firewall 104 are stored as the firewall configuration 122. An initial firewall configuration 124 (e.g., a first firewall configuration) may be modified to a modified firewall configuration 126 (e.g., a second firewall configuration) based on the retrieved firewall configuration information 120. In a particular embodiment, the retrieved firewall configuration information 120 includes configuration information associated with user actions or user choices (e.g., with respect to one or more types of devices and one or more device roles useable to represent an inferred user intent). The modified firewall configuration 126 is stored as the firewall configuration 122 of the host 102. For example, in the initial firewall configuration 124, a particular port may be blocked. The initial firewall configuration 124 may be modified to open the particular port to enable the network entity 108 to communicate with a network service 110 using the particular port. As another example, the initial firewall configuration 124 may be modified to block a port, adjust a communication protocol between the host 102 and the network entity 108, apply one or more security settings at the host 102, enable or disable a service at the host 102, or any combination thereof.

In a particular embodiment, the network entity 108 includes an ActiveSync device (e.g., a smart phone or a personal digital assistant). When the detection component 114 detects the ActiveSync device, the firewall configuration 122 may include an initial firewall configuration 124 where one or more ports are closed. For example, the closed ports may include a transmission control protocol (TCP) port, a user datagram protocol (UDP) port, or any combination thereof. As an example, in order to properly function according to user intent, the ActiveSync device may communicate data over TCP port 100 (e.g., a newacct service) and UDP port 101 (e.g., a hostname service). Upon detecting the ActiveSync device, the configuration component 116 queries the dynamic information store 106 with the type 118 of the network entity 108 (e.g., an ActiveSync device type). Based on the firewall configuration information 120 retrieved from the dynamic information store 106, the programmable firewall 104 may be automatically modified from the initial firewall configuration 124 to the modified firewall configuration 126, where TCP port 100 and UDP port 101 are opened, allowing the ActiveSync device to communicate data over ports 100 and 101.

In a particular embodiment, the modified firewall configuration 126 of the programmable firewall 104 is reverted, or otherwise reversed, when the network entity 108 is no longer detected. For example, when the ActiveSync device is no longer detected, ports 100 and 101 are no longer used for communications and may be closed. Therefore, the modified firewall configuration 126 (e.g., the second firewall configuration where ports 100 and 101 are opened) may revert to the initial firewall configuration 124 (e.g., the first firewall configuration where ports 100 and 101 are closed). Thus, the programmable firewall 104 may be dynamically modified in response to the detection component 114 detecting the network entity 108 or in response to the detection component 114 no longer detecting the network entity 108.

In a particular embodiment, a role 119 associated with the network entity 108 is assigned in order to help safeguard against unwanted automatic configuration based on the type 118 of the network entity 108 alone. For example, the role 119 may be determined at least in part based on a previous decision by a user with respect to the network entity 108 or based on inferred user intent with respect to the network entity 108. In a particular illustrative embodiment, the type 118 of the network entity 108 may be a cellular phone device type. In this case, the role 119 may include a synchronization role, a modem role, and a media role (e.g., a ringtone or other audio playback role). When the role 119 is determined to be the synchronization role, the firewall configuration 122 may be modified based on both the type 118 (e.g., the cellular phone device type) and the role 119 (e.g., the synchronization role). In this way, modifications to the firewall configuration 122 associated with the synchronization role may be made, while other modifications associated with the other possible roles (e.g., the modem role and the media role) are not made.

As another example, a game console device may have both a media center extender role and a file browser role. If the programmable firewall 104 has been set to configure itself for media center extenders but not file browsers, the automatic configuration can be limited to ports and protocols to communicate with the network entity 108 as a media center extender.

As a further example, roles can be grouped together based on an implied level of trust. For example, a parent's desktop computer can mark a child's laptop computer as a low-trust personal computer (PC). Such a PC can be excluded from communications associated with roles marked as high-trust only.

The determination of allowed roles can be made by the user, or the determination can be made automatically based on profiling of the user or from monitoring user actions (i.e., inferred user intent with respect to the role associated with the network entity 108). The role 119 associated with the network entity 108 may be inferred based on one or more user actions. For example, the user actions may include one or more current actions, one or more past actions, or any combination thereof. As an example, when the user action includes a file dragging action, a file share role or a file storage role for the network entity 108 may be inferred. As another example, the host 102 may be a media center PC initially connected to a game console system. A user may have previously decided to use a function between the game console system and the media center PC relating to music. When a portable music player (e.g., an MP3 player) is detected, the media center PC, the game console system, and the portable music player are configured to work together. Thus, previous user decisions (e.g., the previous decision to use the music function) may be used to automatically determine appropriate modifications to the firewall configuration 122 applicable to the portable music player. As a further example, when a user executes an operating system (OS) function at the host 202 to reach a particular network entity for the first time and the ISF 212 detects other related network entities on the network 210, the ISF 212 can be automatically and dynamically modified to allow the related network entities to operate together. To illustrate, the user may execute an OS function for the first time with respect to a fourth network entity (not shown) of the game console device type. Because the fourth network entity and the third network entity 208 share a common device type (e.g., the game console device type), the ISF 212 can be automatically modified such that the fourth network entity and the third network entity 208 operate together, or otherwise operable in a compatible manner, even though the user action only targeted the fourth network entity.

Alternatively, the role 119 associated with the network entity 108 may be defined by a user. For example, the user may select the role 119 from a list of roles using a graphical user interface (not shown) displayed by the host 102. The list of roles may include a media center extender role, a file browser role, and a file share role, among other alternatives. In one embodiment, the role 119 associated with the network entity 108 may be determined using a wizard application (not shown) at the host 102.

In a particular embodiment, the firewall configuration information 120 retrieved from the dynamic information store 106 includes a firewall policy. The firewall policy may be associated with one or more types and one or more roles, or any combination thereof. For example, the firewall policy may relate to one or more ports, communication protocols, or services, among other alternatives.

The system 100 of FIG. 1 may allow automatic detection of the network entity 108 requesting access to one or more network services 110 via the network 112. The programmable firewall 104 may be properly adjusted for each unique network (e.g., the network 112) and for each network entity (e.g., the network entity 108) connected to the host 102 (e.g., a PC). The adjustment to the firewall configuration 122 is performed automatically, without any user interaction or configuration. By automatically adjusting the firewall configuration 122, the user experience may be improved and proper operation of the programmable firewall 104 for specific networks and types may be managed. Further, in the particular embodiment illustrated in FIG. 1, no additional hardware is required, representing a solution that may be implemented with software. In a particular embodiment, the programmable firewall 104 of FIG. 1 represents an intelligent software firewall (ISF) that can detect environment changes (e.g., changes resulting from one or more devices being connected or disconnected) and dynamically update the firewall configuration 122 based on the detected environment changes. That is, the programmable firewall 104 of FIG. 1 may be implemented as a dedicated software module that inspects network traffic and permits or denies the network traffic based on a set of rules (e.g., the firewall configuration information 122). In a particular illustrative embodiment, the ISF (e.g., the programmable firewall 104) is configured to allow certain device roles. That is, for a particular device associated with a particular device role, the ISF may inspect network traffic from the particular device and permit or deny the network traffic based on rules associated with the particular device role.

For example, third generation (3G) wireless data connections should typically be configured for limited communications so that unnecessary traffic does not reach the host 102. As another example, generic Bluetooth and universal serial bus (USB) connections should typically be configured for unlimited communications, because these connections are often associated with end-point devices. Further, ActiveSync connections (e.g., smart phones, personal digital assistants) may be configured for either limited or unlimited communications based on how the network entity is being used. As a further example, home network scenarios may involve multiple network entities with capabilities that may not be desirable (e.g., file sharing between specific computers).

Figure 2:
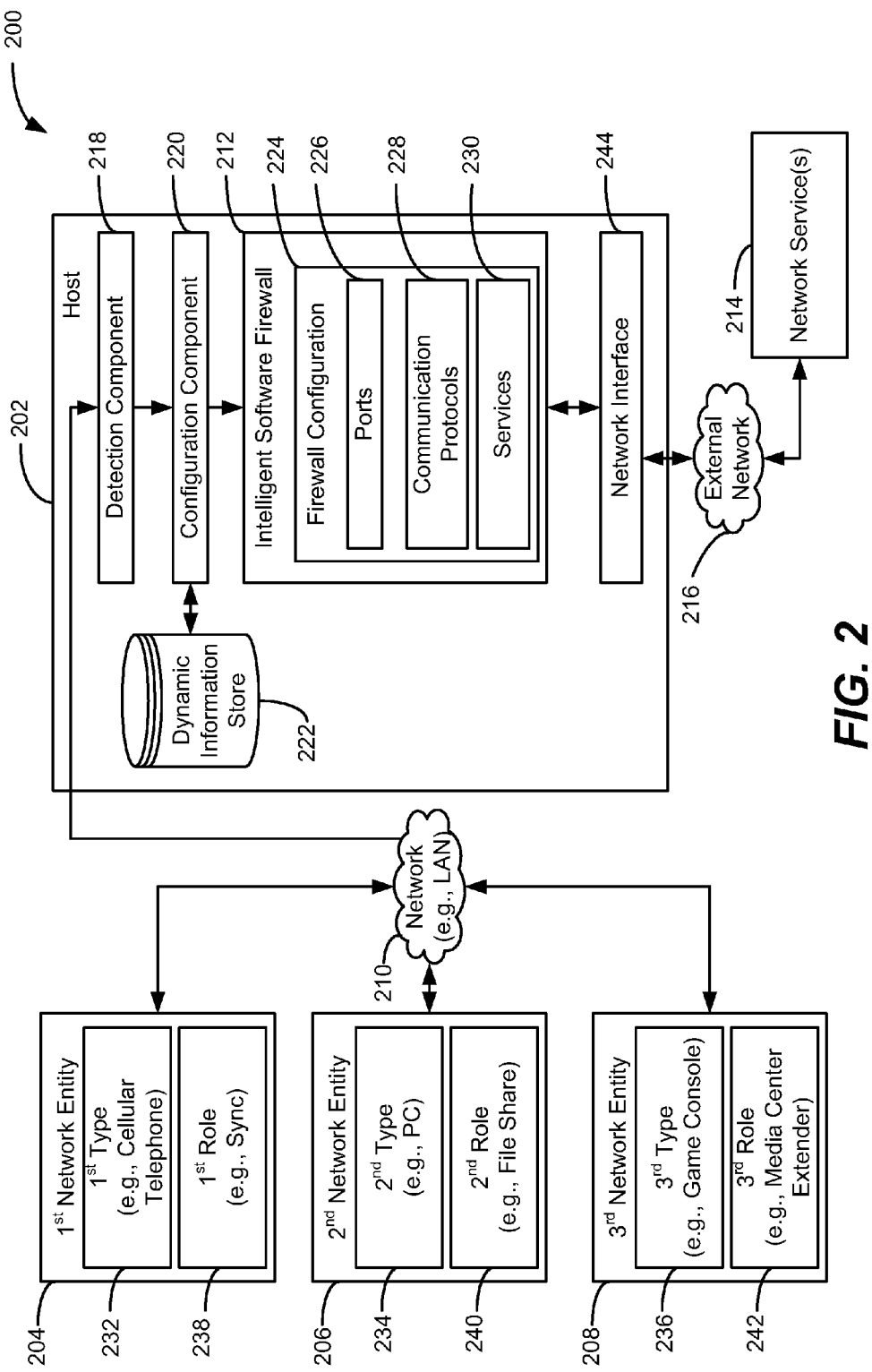
FIG. 2 is a block diagram of a second embodiment of a dynamic firewall configuration system.

Referring to FIG. 2, a second embodiment of a dynamic firewall configuration system is illustrated and generally designated 200. In the embodiment illustrated in FIG. 2, the system 200 includes a host 202 with an intelligent software firewall (ISF) 212, a detection component 218, a configuration component 220, and a network interface 244. The host 202 is in communication with a dynamic information store 222. In the particular embodiment illustrated in FIG. 2, the dynamic information store 222 is stored locally at the host 202, rather than at a remote network location.

The system 200 further includes a plurality of network entities that may be physically or remotely connected to the host 202. For example, in FIG. 2, the plurality of network entities includes a first network entity 204, a second network entity 206, and a third network entity 208 that may be connected to the host 202 via a network 210 (e.g., a local area network (LAN)). Each of the plurality of network entities 204, 206 and 208 may request access to one or more network services 214 that are accessible via an external network 216 (e.g., the Internet or a virtual private network) from the host 202. The host 202 is coupled to the external network 216 via the network interface 244.

The configuration of the ISF 212 is stored as a firewall configuration 224. For example, the firewall configuration 224 may include one or more ports 226, one or more communication protocols 228, and one or more services 230. The firewall configuration 224 may be automatically and dynamically modified using firewall configuration information retrieved from the dynamic information store 222. For example, the ISF 212 may be modified upon detection of one or more of the network entities 204, 206, and 208 (e.g., when one of the network entities 204, 206, and 208 connects to the network 210).

In operation, the detection component 218 detects one of the plurality of network entities 204, 206 and 208. In response, the detection component 218 determines a type of the detected network entity. In the embodiment illustrated, the first network entity 204 includes a first type 232 (e.g., a cellular phone device type); the second network entity 206 includes a second type 234 (e.g., a personal computer (PC) device type); and the third network entity 208 includes a third type 236 (e.g., a game console device type).

As an example, the detection component 218 may detect the connection of the first network entity 204 to the network 210. In response to detecting the first network entity 204, the detection component 218 determines that the type of the first network entity 204 is the first type 232 (e.g., the cellular phone device type). As another example, the detection component 218 may detect the connection of the second network entity 206 to the network 210 and determine that the type of the second network entity 206 is the second type 234 (e.g., the PC device type). As a further example, the detection component 218 may detect the connection of the third network entity 208 to the network 210 and determine that the type of the third network entity 208 is the third type 236 (e.g., the game console device type). As previously noted, the type of the network entity may be determined based on an identifier or a fingerprint, or any combination thereof.

The detection component 218 communicates the determined type to the configuration component 220. The configuration component 220 queries the dynamic information store 222 using the type information. For example, the configuration component 220 queries the dynamic information store 222 using the first type 232 (e.g., the cellular phone device type) for the first network entity 204, using the second type 234 (e.g., the PC device type) for the second network entity 206, or using the third type 236 (e.g., the game console device type) for the third network entity 208.

Firewall configuration information stored at the dynamic information store 222 is communicated from the dynamic information store 222 to the configuration component 220. In a particular embodiment, the firewall configuration information includes a firewall policy associated with a particular type of network entity. The ISF 212 may be automatically and dynamically modified based on the firewall configuration information retrieved from the dynamic information store 222. For example, when the first network entity 204 is detected, the firewall policy associated the first type 232 (e.g., the cellular phone device type) may include enabling synchronization ports and disabling modem ports. As a result, the firewall configuration 224 may be automatically modified to enable one or more ports 226 associated with synchronization functionality and to disable one or more ports 226 associated with modem functionality.

As another example, when the second network entity 206 is detected, the firewall policy associated the second type 234 (e.g., the PC device type) may include enabling a file share service. The file share service may be enabled at the host 202 in response to receiving a request from the ISF 212 to enable the file share service. As a further example, when the third network entity 208 is detected, the firewall policy associated with the third type 236 (e.g., the game console device type) may include enabling audio and video services at the host 202.

The ISF 212 of the host 202 may be automatically and dynamically modified based on the type of network entity detected, a role associated with the detected network entity, or any combination thereof. In the embodiment illustrated, the first network entity 204 includes a first role 238 (e.g., a synchronization role); the second network entity 206 includes a second role 240 (e.g., a file share role); and the third network entity 208 includes a third role 242 (e.g., a media extender role).

As an example, the detection component 218 may detect the first network entity 204. In response to detecting the first network entity 204, the detection component 218 determines that the role of the first network entity 204 is the first role 238 (e.g., the synchronization role). As another example, the detection component 218 may detect the second network entity 206 and determine that the role of the second network entity 206 is the second role 240 (e.g., the file share role). As a further example, the detection component 218 may detect the third network entity 208 and determine that the role of the third network entity 208 is the third role 242 (e.g., the media center extender role).

The detection component 218 communicates the determined role to the configuration component 220. The configuration component 220 queries the dynamic information store 222 using the role associated with the network entity. For example, the configuration component 220 may query the dynamic information store 222 using the first role 238 (e.g., the synchronization role) for the first network entity 204, using the second role 240 (e.g., the file share role) for the second network entity 206, or using the third role 242 (e.g., the media center extender role) for the third network entity 208.

The ISF 212 may be automatically and dynamically modified based on the firewall configuration information retrieved from the dynamic information store 222. In a particular embodiment, the firewall configuration information includes a firewall policy associated with a particular role. For example, the firewall policy associated with the first role 238 (e.g., the synchronization role) may include enabling synchronization ports and disabling modem ports. Similarly, the firewall policy associated with the second role 240 (e.g., the file share role) may include enabling a file share service, and the firewall policy associated with the third role 242 (e.g., the media center extender role) may include enabling audio and video services.

As noted above, the ISF 212 of the host 202 may be automatically and dynamically modified based on the type of network entity detected, the role associated with the detected network entity, or any combination thereof. For example, certain types of network entities may have multiple roles. The dynamic information store 222 may be queried based on a combination of the type and the role. For example, for the cellular phone device type, the roles may include a synchronization role, a modem role, and a media role. When the role is the synchronization role, the ISF 212 may be modified to enable one or more synchronization ports and to disable modem ports. When the role is the modem role, the ISF 212 may be modified to enable modem ports and to disable synchronization ports. When the role is the media role, the synchronization ports and the modem ports may be disabled, while a media service at the host 202 may be enabled.

Figure 3:
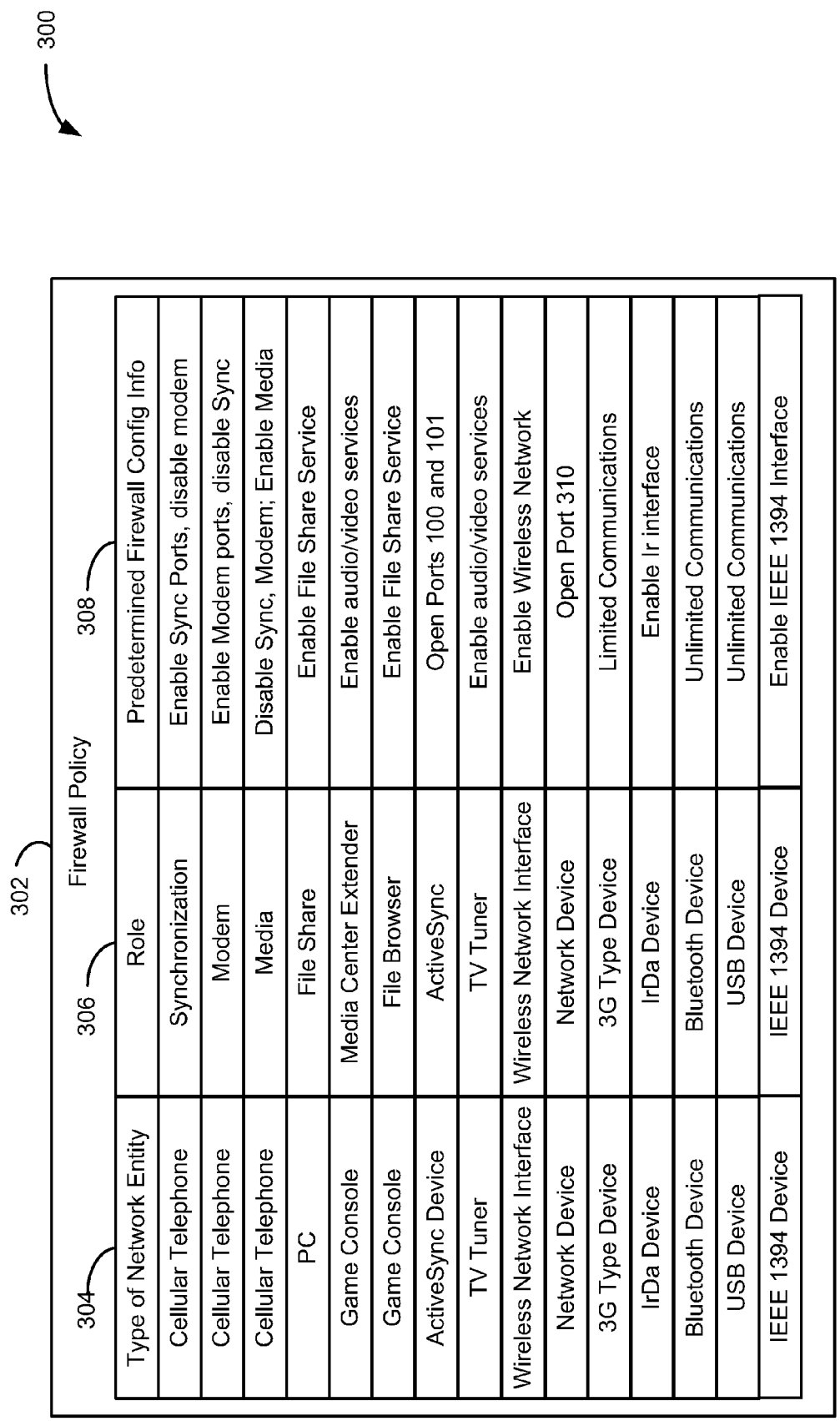
FIG. 3 is an illustrative diagram of an embodiment of firewall configuration information.

Referring to FIG. 3, an illustrative embodiment of firewall configuration information is illustrated and generally designated 300. A list of firewall policies 302 may be stored at a dynamic information store (e.g., the dynamic information store 106 of FIG. 1 or the dynamic information store 222 of FIG. 2). A firewall policy may vary based on a type 304 of network entity, a role 306 associated with the network entity, or any combination thereof. Predetermined firewall configuration information 308 may be stored for each combination of type 304 and role 306. It should be noted that the types, roles, and predetermined firewall configuration information 308 listed in FIG. 3 are for illustrative purposes only and do not represent all the possible options available.

As an example, for the cellular telephone device type, the roles may include a synchronization role, a modem role, and a media role. When the role is the synchronization role, a firewall configuration may be modified to enable one or more synchronization ports and to disable modem ports. When the role is the modem role, the firewall configuration may be modified to enable modem ports and to disable synchronization ports. When the role is the media role, the synchronization ports and the modem ports may be disabled, while a media service may be enabled. For example, in FIG. 2, the first type 232 of the first network entity 204 is the cellular phone device type, and the first role 238 is the synchronization role. In response to detecting the first network entity 204, the dynamic information store 222 may be queried based on the cellular phone device type and the synchronization role. As shown in FIG. 3, the predetermined firewall configuration information 308 associated with the cellular telephone device type and synchronization role includes enabling synchronization ports and disabling modem ports. The ports 226 of the firewall configuration 224 of the ISF 212 of FIG. 2 may be modified accordingly.

As another example, for the game console device type, the roles may include a media center extender role and a file browser role. When the role is the media center extender role, a firewall configuration may be modified to enable audio and video services. When the role is the file browser role, the firewall configuration may be modified to enable a file share service. For example, in FIG. 2, the third type 236 of the third network entity 208 is the game console device type, and the third role 242 is the media center extender role. In response to detecting the third network entity 208, the dynamic information store 222 may be queried based on the game console device type and the media center extender role. As shown in FIG. 3, the predetermined firewall configuration information 308 associated with the game console device type and media center extender role includes enabling audio and video services. The services 230 of the firewall configuration 224 of the ISF 212 of FIG. 2 may be modified accordingly.

Figure 4:
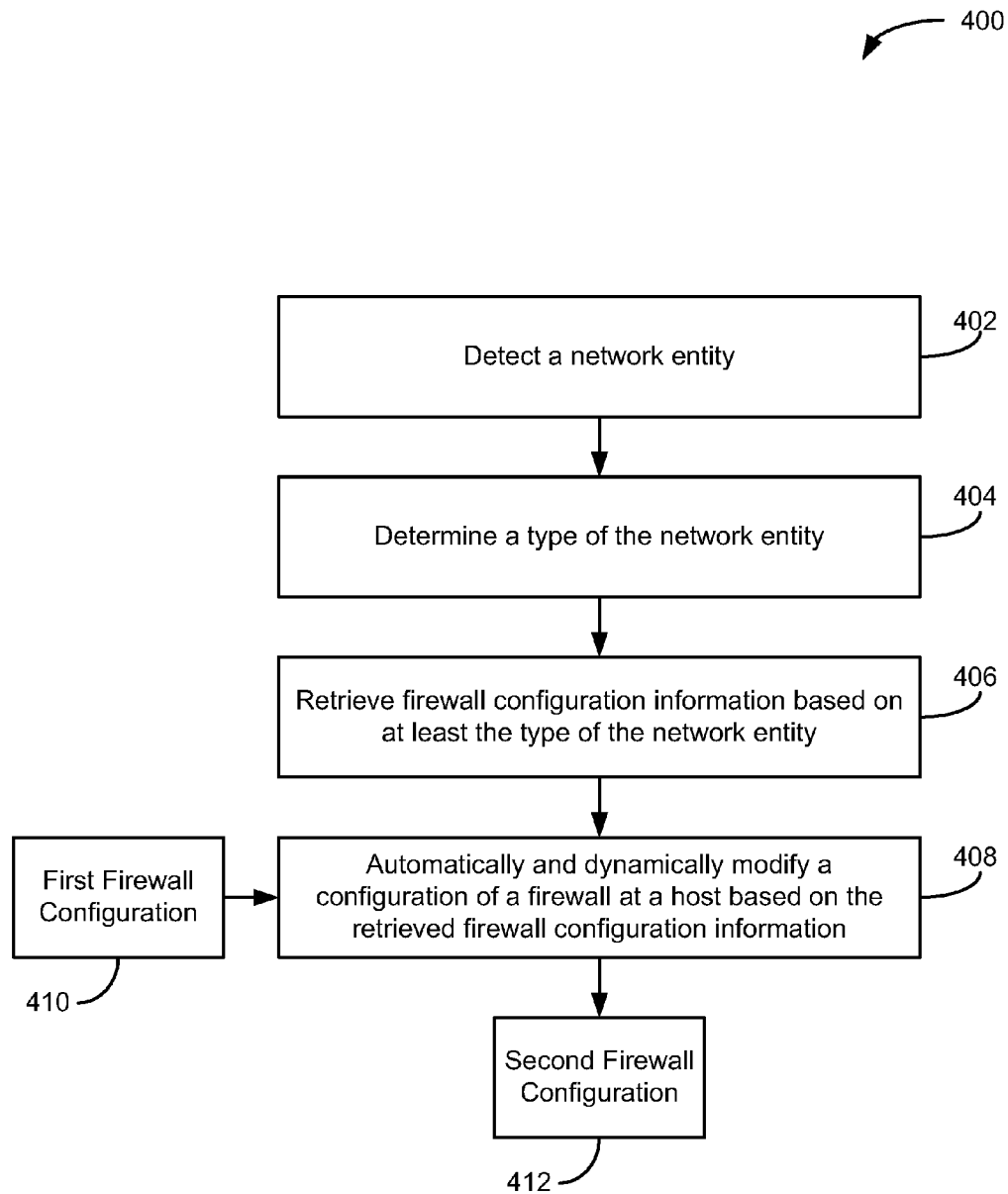
FIG. 4 is a flow diagram of a first embodiment of a dynamic firewall configuration method.

Referring to FIG. 4, a first particular embodiment of a dynamic firewall configuration method is illustrated and generally designated 400. At 402, the method includes detecting a network entity. For example, in FIG. 1, the network entity 108 may be detected by the detection component 114 of the host 102. As another example, in FIG. 2, any of the plurality of network entities 204, 206 and 208 may be detected by the detection component 218 of the host 202. In a particular embodiment, the method 400 includes detecting a physical connection of the network entity at the host (e.g., the host 102 of FIG. 1 or the host 202 of FIG. 2). In another particular embodiment, the method 400 includes detecting a connection of the network entity via a network.

The method includes determining a type of the network entity, at 404. For example, the type 118 of the network entity 108 may be determined by the detection component 114 of FIG. 1. As another example, the first type 232 of the first network entity 204, the second type 234 of the second network entity 206, or the third type 236 of the third network entity 208 may be determined by the detection component 218 of FIG. 2.

The method includes retrieving firewall configuration information based on at least the type of the network entity, at 406. The firewall configuration information may be retrieved from a local information store or from a remote information store. For example, in FIG. 1, the firewall configuration information 120 may be retrieved from the dynamic information store 106 stored remotely from the host 102. As another example, in FIG. 2, the firewall configuration information may be retrieved from the dynamic information store 222 stored locally at the host 202.

A configuration of a firewall at the host is automatically and dynamically modified based on the retrieved firewall configuration information, at 408. For example, the configuration of the firewall at the host may be modified from a first firewall configuration 410 to a second firewall configuration 412. For example, in FIG. 1, the programmable firewall 104 of the host 102 is automatically and dynamically modified from the initial firewall configuration 124 to the modified firewall configuration 126, in response to detecting the network entity 108. Similarly, in FIG. 2, the ISF 212 of the host 202 is automatically and dynamically modified in response to detecting one or more of the network entities 204, 206 and

208. It should be appreciated that the ISF 212 of the host 202 may be automatically and dynamically modified in response to events other than the detection of a network entity. For example, some other event at the host 202 may be detected by a detection component other than the detection component 218 of FIG. 2. Further, information other than a type of network entity and a role associated with the network entity may be used to retrieve event-specific policy and configuration information from the dynamic information store 222.

Figure 5:
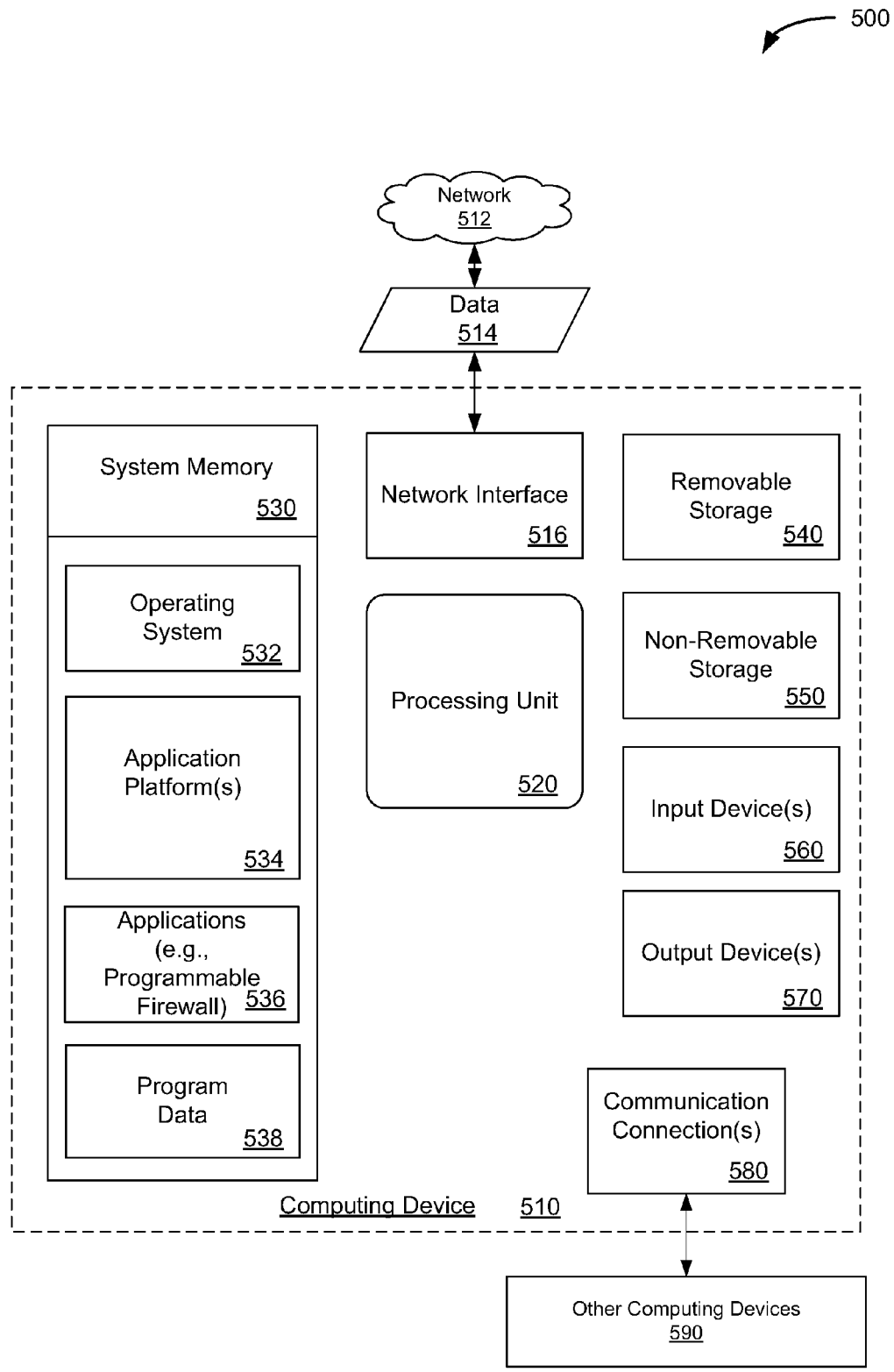
FIG. 5 is a block diagram of an illustrative embodiment of a general purpose computing system.

FIG. 5 shows a block diagram of a computing environment 500 including a computing device 510 operable to support embodiments of computer-implemented methods and computer program products according to the present disclosure. In a basic configuration, the computing device 510 may include a host computer configured to process transactions, such as firewall modification transactions described with reference to FIG. 1 and FIG. 2.

The computing device 510 typically includes at least one processing unit 520 and system memory 530. Depending on the configuration and type of computing device, the system memory 530 may be volatile (such as random access memory or "RAM"), non-volatile (such as read-only memory or "ROM," flash memory, and similar memory devices that maintain the data they store even when power is not provided) or some combination of the two. The system memory 530 typically includes an operating system 532, one or more application platforms, one or more applications 536 (e.g., the programmable firewall 104 of FIG. 1 or the ISF 212 of FIG. 2), and may include program data 538.

The computing device 510 may also have additional features or functionality. For example, the computing device 510 may also include removable and/or non-removable additional data storage devices such as magnetic disks, optical disks, tape, and standard-sized or miniature flash memory cards. Such additional storage is illustrated in FIG. 5 by removable storage 540 and non-removable storage 550. Computer storage media may include volatile and/or non-volatile storage and removable and/or non-removable media implemented in any method or technology for storage of information such as computer-readable instructions, data structures, program components or other data. The system memory 530, the removable storage 540 and the non-removable storage 550 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium which can be used to store information and which can be accessed by computing device 510. Any such computer storage media may be part of the device 510. The computing device 510 may also have input device(s) 560, such as a keyboard, mouse, pen, voice input device, touch input device, etc. Output device(s) 570, such as a display, speakers, printer, etc. may also be included. The computing device 510 also contains a network interface 516 to send and receive data 514 via a network 512. For example, the network 512 may include the network 112 of FIG. 1 or the external network 216 of FIG. 2.

The computing device 510 also contains one or more communication connections 580 that allow the computing device 510 to communicate with other computing devices 590 over a wired or a wireless network. For example, the other computing devices 590 may include the device 108 of FIG. 1, or the devices 204, 206, and 208 of FIG. 2. The one or more communication connections 580 are an example of communication media. By way of example, and not limitation, communication media may include wired media such as a wired network or direct-wired connection, and wireless media, such as acoustic, radio frequency (RF), infrared and other wireless media. It will be appreciated, however, that not all of the components or devices illustrated in FIG. 5 or otherwise described in the previous paragraphs are necessary to support embodiments as herein described.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method, comprising:
   detecting a network entity;
   determining a type of the network entity;
   determining a plurality of roles associated with the type of the network entity;
   in response to detecting a user action, inferring an intent associated with the user action;
   selecting a particular role of the plurality of roles based on at least the inferred intent; and
   automatically and dynamically modifying a configuration of a firewall at a host based on firewall configuration information that is associated with the particular role selected based on at least the inferred intent.

2. The method of claim 1, wherein the particular role is further selected based on a trust level associated with the network entity.

3. The method of claim 2, wherein a first role is selected and the configuration of the firewall is modified to a first firewall configuration when the network entity is associated with a first trust level, wherein a second role is selected and the configuration of the firewall is modified to a second firewall configuration when the network entity is associated with a second trust level, and wherein the first firewall configuration is different from the second firewall configuration.

4. The method of claim 1, further comprising:
   gathering information associated with the network entity, wherein the type of the network entity is determined based on the gathered information; and
   querying a dynamic information store using the gathered information to retrieve the firewall configuration information;
   wherein the firewall at the host includes an intelligent software firewall, and wherein the intelligent software firewall is configured to inspect network traffic and to permit or deny the network traffic based on the firewall configuration information.

5. The method of claim 1, wherein automatically and dynamically modifying the configuration of the firewall at the host includes opening a port of the firewall, blocking a port of the firewall, adjusting a communication protocol between the host and a device, applying one or more security settings, enabling a service at the host, or any combination thereof.

6. The method of claim 1, wherein the type of the network entity is determined based on a device identifier of the network entity, a fingerprint of the network entity, or any combination thereof.

7. The method of claim 1, wherein the type of the network entity includes a cellular telephone device type, and wherein the plurality of roles includes a synchronization role, a modem role, and a media role.

8. The method of claim 1, wherein the particular role is selected using a wizard application at the host.

9. The method of claim 1, wherein the plurality of roles is defined by a user.

10. The method of claim 1, wherein the plurality of roles is selected by a user from a list of roles, the list of roles including a synchronization role, a modem role, a media role, a Bluetooth role, a universal serial bus role, a television tuner role, a wireless network interface role, a media center extender role, a file browser role, and a file share role.

11. The method of claim 1, further comprising automatically and dynamically modifying the configuration of the firewall at the host when the network entity is no longer detected.

12. The method of claim 1, wherein the configuration of the firewall at the host is modified in substantially real-time upon detection of the network entity.

13. A system, comprising:
   a programmable firewall at a host;
   a processor;
   a detection component executable by the processor to:
      detect a network entity;
      determine a type of the network entity;
      detect a user action; and
   a configuration component executable by the processor to:
      determine a plurality of roles associated with the type of the network entity;
      in response to detecting the user action, infer an intent associated with the user action;
      select a particular role of the plurality of roles based on at least the inferred intent; and
      automatically and dynamically modify a configuration of the programmable firewall at the host based on firewall configuration information that is associated with the particular role selected based on at least the inferred intent.

14. The system of claim 13, wherein the network entity includes a local device physically connected to the host, wherein the local device includes one of a gaming device, a television tuner, a local area network device, a wireless network interface card, a digital cable receiver, and a mobile device.

15. The system of claim 14, wherein the mobile device includes one of a Third Generation (3G) type device, an ActiveSync device, an Infrared Data Association (IrDa) device, a Bluetooth device, a universal serial bus (USB) device, and an Institute of Electrical and Electronics Engineers (IEEE) 1394 device.

16. The system of claim 13, wherein the network entity includes a remote device located at a location remote from the host, wherein the remote device is connected to the host via a network.

17. The system of claim 13, wherein the configuration component is further executable by the processor to determine a trust level associated with the network entity and wherein the particular role is further selected based on the trust level associated with the network entity.

18. The system of claim 17, wherein a first role is selected and the configuration of the programmable firewall is modified to a first firewall configuration when the network entity is associated with a first trust level, wherein a second role is selected and the configuration of the programmable firewall is modified to a second firewall configuration when the network entity is associated with a second trust level, and wherein the first firewall configuration is different from the second firewall configuration.

19. A computer-readable storage device comprising instructions that, when executed by a computer, cause the computer to:
- determine a type of a network entity;
- determine a plurality of roles associated with the type of the network entity, wherein each role of the plurality of roles is associated with one or more ports, protocols, and services;
- in response to detecting a user action, infer an intent associated with the user action;
- select a particular role of the plurality of roles based on at least the inferred intent; and
- automatically and dynamically modify a configuration of a firewall at the computer based on firewall configuration information that is associated with the particular role selected based on at least the inferred intent.

20. The computer-readable storage device of claim 19, further comprising instructions that, when executed by the computer, cause the computer to determine a trust level associated with the network entity, wherein the particular role is further selected based on the trust level associated with the network entity, wherein a first role is selected and the configuration of the firewall is modified to a first firewall configuration when the network entity is associated with a first trust level, wherein a second role is selected and the configuration of the firewall is modified to a second firewall configuration when the network entity is associated with a second trust level, and wherein the first firewall configuration is different from the second firewall configuration.

* * * * *